July 9, 1940.  E. B. FERNBERG  2,207,374
FASTENER
Filed Nov. 22, 1939
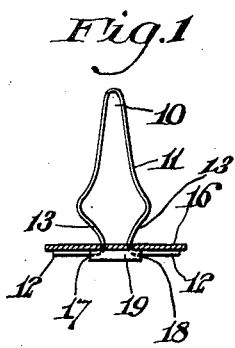
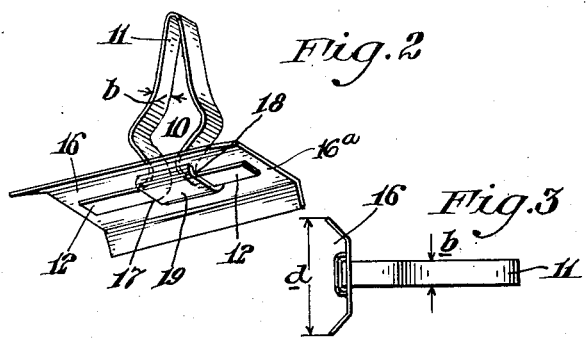
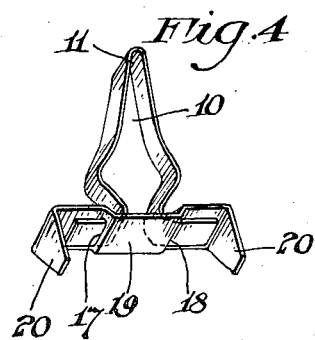
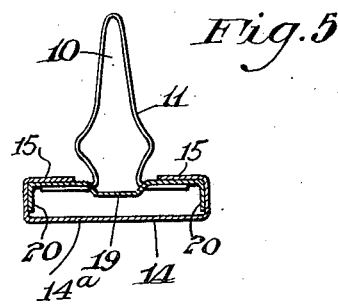
Inventor
ERIC BIRGER FERNBERG
By Leon Edelson
Attorney.

Patented July 9, 1940

2,207,374

UNITED STATES PATENT OFFICE 2,207,374

FASTENER

Eric Birger Fernberg, Pinner, England

Application November 22, 1939, Serial No. 305,579
In Great Britain November 7, 1938

2 Claims. (Cl. 24—73)

The present invention relates to an improved fastener, particularly, although not exclusively, suitable for use in the automobile industry for the purpose of securing a beading to a panel, a radiator grid to the radiator shell and so forth. Or it may be used in shop fittings in the front of shops and in the manufacture of furniture. Hereinafter the expression "beading" will be used to denote the above-mentioned members.

In Figure 1 of the drawing accompanying the complete specification of British Patent No. 451,721 there is illustrated a fastener comprising a stud and a retainer therefor. As will be seen the stud comprises a single strip of spring steel bent to substantially U-form by bending in one plane only, the limbs of the U being shaped to engage the edges of apertures formed in one of the members to be fastened and the limbs being further formed with out-turned feet for cooperation with the retainer by insertion through a central opening formed in the latter.

The fastener according to the present invention comprises a stud and retainer assembly in which the stud is identical with or similar to that above-mentioned, while the retainer of the above-mentioned fastener is replaced by one having a pair of parallel slots formed in the body thereof through which the out-turned feet of the stud are respectively projected, these slots being so formed and arranged as to permit the feet of the stud to slidably engage the under surface of the retainer, the said stud and retainer assembly being adapted to secure a beading of channel or C cross-section to a panel. In accordance with the present invention, one or more of the said stud and retainer assemblies are so slidably associated with said channeled beading that they may be shifted longitudinally of the latter to respectively locate them at appropriate locations along the length of the beading.

Preferred embodiments of the invention will now be described with reference to the accompanying diagrammatic drawing, in which:

Figure 1 is an elevation of a stud and retainer constructed in accordance with and embodying the principles of the present invention;

Figure 2 is a perspective view of the device shown in Figure 1;

Figure 3 is a side edge view of the assembly shown in Figure 1;

Figure 4 is a perspective view of another retainer and a stud slidably mounted therein; and Figure 5 is an elevation partly in section of the device shown in Figure 4 mounted in a beading.

Referring now to Figures 1 and 2, a snap stud 10 is formed from a single strip of spring steel 11. The strip is bent symmetrically about its centre to form two limbs of a U, which limbs are bent inwardly to form a neck 13 and the rectangular ends are then bent outwardly to form the pair of feet 12. As shown in Figures 1 and 2, the feet 12 of the stud 10 are secured in a retainer 16 formed from a rectangular blank. At the centre of the retainer plate are formed two parallel sheer cuts 17 and 18, the material 19 between the cuts being forced out of the general plane of the flat portion 16a of retainer 16 in which are formed the parallel cuts 17 and 18 and the distance between the cuts being such that the two feet 12 of the stud may be passed one through each slot. This is effected by passing one foot through one of the slots and then pinching the stud and passing the other foot through the other slot.

Such a stud and retainer assembly is adapted to secure a beading 14 (Figure 5) to a panel, the beading being formed from a strip of metal, or other material of generally channel form, after which the margins of the beading 14 are folded inwardly to form flanges 15, so that the beading is of C-section and forms a slide within which the assembled stud and retainer may be passed as a unit. The distance between the turned-in edges of the beading is slightly greater than the width b of the U-portion of the stud and considerably less than the width d of the retainer.

In operation, several of the stud and retainer assemblies are slipped into the end of the beading 14 and slid along until they reach their appropriate positions along the length of the beading. The studs are then snapped through holes in the panel (not shown) or the like, so as to secure the beading to the panel. The diameter of the holes, whether they be rectangular or round, is approximately equal to the outside width of the neck of the stud when the latter is pinched and is in the hole. The feet 12 of each stud slide within the beading towards and away from each other when the U of the stud is pinched and released, as it snaps through the hole in the panel.

In cases where the distance between the web 14a and flanges 15 of the beading 14 is fairly large, in order to prevent the stud and retainer assembly from moving backwards and forward between the web and flanges, the retainer is formed, as shown in Figure 4, with a pair of legs 20 which, as shown in Figure 5, effectively hold the stud in its appropriate position with respect to the beading, these legs 20 being of such depth and so spaced apart as to materially limit the permissible movement of the stud and retainer assembly within the beading.

I claim:

1. A fastener for securing beading to another member, comprising a stud in the form of a single flat strip of spring steel bent to substantially U-form to provide opposed limbs disposed with the flat surfaces thereof extending substantially at right angles to a common median plane, the limbs of the U having a shape adapted to engage the edges of an aperture formed in said member, said limbs being respectively further provided with out-turned feet, a retainer operatively associated with said stud and formed with a pair of parallel cuts, the material between said cuts being offset from the general plane of the retainer so that the out-turned feet of the stud may slidably engage the under surface of the retainer, and a beading of channel section within which the retainer is slidably received, said beading having inturned flanges along the upper edges of the channel walls thereof.

2. A fastener for securing beading to another member, comprising a stud in the form of a single flat strip of spring steel bent to substantially U-form to provide opposed limbs disposed with the flat surfaces thereof extending substantially at right angles to a common median plane, the limbs of the U having a shape adapted to engage the edges of an aperture formed in said member, said limbs being respectively further provided with out-turned feet, a retainer operatively associated with said stud and formed with a pair of legs and with a pair of parallel cuts, the material between said cuts being offset from the general plane of the retainer so that the out-turned feet of the stud may slidably engage the under surface of the retainer, and a beading of C-section within which the retainer is slidably engaged, the depth of said beading being sufficent to snugly accommodate the legs of the retainer to thereby preclude unrestrained play of the latter in said beading.

ERIC BIRGER FERNBERG.